H. C. EGERTON.
FABRIC.
APPLICATION FILED MAR. 3, 1919. RENEWED FEB. 16, 1920.
1,352,739.
Patented Sept. 14, 1920.
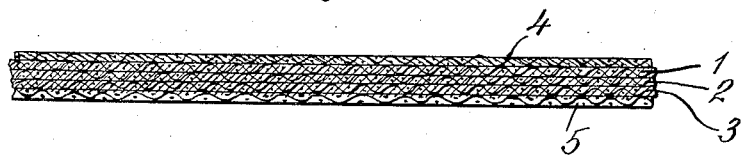
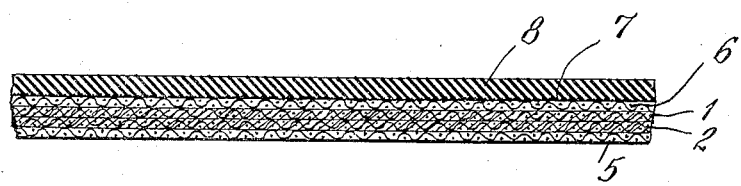
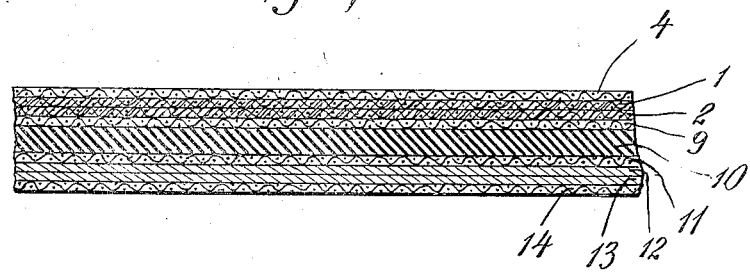
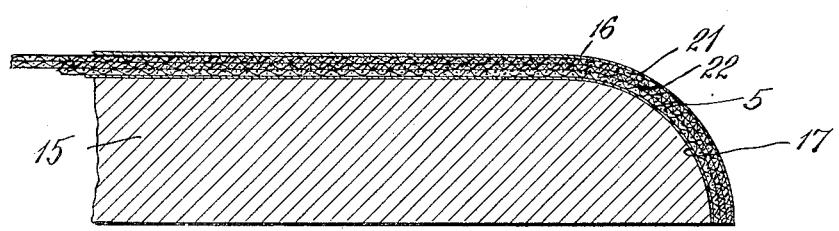
Inventor
Henry C Egerton
By his Attorney
Harry L Duncan

UNITED STATES PATENT OFFICE.

HENRY C. EGERTON, OF RIDGEWOOD, NEW JERSEY.

FABRIC.

1,352,739.

Specification of Letters Patent.

Patented Sept. 14, 1920.

Application filed March 3, 1919, Serial No. 280,352. Renewed February 16, 1920. Serial No. 359,199.

*To all whom it may concern:*

Be it known that I, HENRY C. EGERTON, a citizen of the United States, and resident of Ridgewood, county of Bergen, State of New Jersey, have made a certain new and useful Invention Relating to Fabrics, of which the following is a specification, taken in connection with the accompanying drawing.

This invention relates especially to composite fabrics and fabric articles comprising a number of layers of suitable fabric, such as cloth, paper, wadding or other fibrous material which may be more or less coated or impregnated with phenolic condensation cementing material, such, for instance, as dried bakelite, condensite or redmanol varnish compositions; so that when heated and pressed together they may form united body fabrics, which may, if desired, be only partially cured so as to be yieldable or more or less plastic on further heating. Such body fabrics may advantageously have adhesively secured to one or both sides thereof, facing fabrics of knit or woven cloth or other fibrous material which may be united or secured to the body fabric, by the phenolic condensation cementing material with which the body fabrics are coated or impregnated, at the same time that these body fabrics are united and secured together during the heat curing treatment. Such facing fabric preferably is not completely impregnated with such cementing material, the exposed surface of the fabric or at least considerable proportions of the fibrous material thereof, being left in sufficiently absorbent fibrous condition so that suitable adhesives, like glue or other cements, may be applied and sufficiently incorporated with the fibrous material of this facing so as to be securely and adhesively united thereto, and thus serve as a convenient and effective means for securing the composite fabric including the impregnated body fabric material to any desired article. In some cases facing fabric of this character may be used on both sides of the body fabric and it is sometimes desirable to incorporate in the intermediate portions of the fabric article one or more continuous layers or separated portions or members of vulcanized rubber or other resilient cushioning material, such, for instance, as sponge rubber or the like which is desirable for cushioning purposes or for additional waterproofing or other properties when used on one of the exposed surfaces of the composite fabric or article made therefrom.

In the accompanying drawing forming part of this application and showing in a somewhat diagrammatic way a number of illustrative embodiments, Figure 1 is an enlarged diagrammatic section through one form of fabric.

Fig. 2 is a similar sectional view showing another composite fabric or fabric article.

Fig. 3 shows still another form of composite fabric; and

Fig. 4 is a diagrammatic view showing one of such composite fabrics applied to a support or other article so as to form a composite fabric article suitable for various uses.

As shown diagrammatically in Fig. 1 the composite fabric may comprise any desired number of layers of body fabric, such as 1, 2, 3, which may be formed of canvas or other suitable fabric or fibrous material which preferably has been coated and quite thoroughly impregnated with suitable phenolic condensation cementing material of this general character, such as bakelite varnish No. 1, which by repeated applications may be absorbed or rendered adherent thereto so that on drying the treated fabric comprises some thirty to sixty per cent. of the phenolic condensation cementing material. A number of layers of such fabric may be forced together under pressure at the desired curing heat for the particular kind of phenolic condensation cementing material employed and thus permanently and securely united by the complete or partial curing of the incorporated cementing material which is to a greater or less extent converted or solidified into the infusible hard form of such condensation material. The final curing may be effected by heating under pressure for a quarter to a half an hour more or less at temperatures of 300° to 320° Fahrenheit or so which renders the fabric strong and resistant to moisture and ordinary chemical agents while still somewhat resilient so that considerable bending can take place without undersirable or destructive cracking of the material. In many cases, however, merely a slight or partial curing of such impregnated or coated body fabrics is sufficient to permanently and securely unite them and for this purpose a much less extended or intense heat treatment is sufficient. Several layers of such bakelite impregnated canvas or similar material when forced together at high pressure and given a partial curing at 300° to 320° Fahrenheit or so for about five minutes are permanently united and compacted so that the fabric layers do not readily separate, and yet on subsequent heating to temperatures of about 300° Fahrenheit or more the composite fabric is rendered quite pliable because the incorporated partly cured cementing material is rendered plastic by such heat so that considerable bending and other re-shaping of the composite fabric is possible to suit different conditions of use and allow the fabric to be molded up into articles of any desired shape and size. It is highly desirable in this connection to incorporate with or unite to the body fabric one or more layers of securing facing fabric such as any suitable cotton or other fabric or fibrous material which preferably has the threads or fibers in rather loosely twisted condition so that it is absorbent on its exposed surface for cementing union with other articles and materials. Such securing facing fabric may be sufficiently embedded in the phenolic condensation cementing material of the body fabric to be permanently secured thereto if the uncoated facing fabric is applied to the body fabric in the uniting molding operation which seems to effect the partial impregnation or penetration of the outer or exposed layer of the phenolic condensation cementing material through the adjacent face or portion of the facing fabric so as to effect the secure union thereof with the layers of body fabric without undesirably filling or rendering impervious the other or exposed face of this facing fabric. The facing fabrics 4 and 5 both of which may be used, if desired, may be of cotton cloth of this general character, preferably having rather loosely twisted threads and may be securely united to the body fabric layers within and partly or wholly cured as above described while this union of the fabrics is being effected.

The facing fabric on one or both sides of this composite fabric material may thus be used to unite the fabric to articles or supports by applying any suitable adhesive or cementing material to the securing facing fabric which is sufficiently penetrated or impregnated therewith so that efficient union is secured to enable the composite fabric to be cemented or adhesively secured in this way to any desired article. For example, water soluble gum or glue may be applied to a securing facing fabric on one side of the composite fabric article and used to adhesively secure the same to a wood or other support, and in some cases such adhesive coating may be applied to the composite fabric or article during its original manufacture and then is moistened or rendered adhesive by the application of water or steam when the adhesive or cementing union of the fabric is to be effected. In some cases it is desirable to use a non-aqueous cementing composition in this connection, as for instance, rubber or other suitable cement may be originally incorporated with or applied to the securing facing fabric on one or both sides of the composite fabric or article which may be stamped or severed into pieces of the desired size and applied to or united with various articles or materials after such shaping operations; and after heating the composite fabric it may when partially cured be shaped or molded into any desired form for more effective union with the other coöperating elements of the article. A composite fabric such as is indicated in Fig. 1 may have its securing facing fabrics coated with or more or less impregnated by vulcanizable rubber cementing compositions and after being cut into proper shape and sufficiently softened by heat as by heating to 300° F. or so on a hot plate, these composite fabric articles may be molded into the soles, counters or other parts of rubber boots, shoes, or the like, and vulcanized or otherwise permanently united thereto by any suitable methods. Other cementing or adhesive compositions may be used with such facing fabrics on one or both sides of such a composite fabric article and may be used to unite it to other materials or articles for stiffening, facing or protecting purposes, and in this way fabric of this kind may be used for stiffening any desired portions of leather or other foot-wear either after the composite fabric has been cured into its strong permanent condition by the substantially complete or moderate curing of the incorporated phenolic condensation cementing material, or if desired, the fabric stiffener may be secured or incorporated in the article in uncured or partly cured condition and subsequently cured or solidfied by suitable heat treatment therewith.

Fig. 2 shows another illustrative embodiment of the invention in which the desired number of layers of body fabric, such as 1, 2 of coated or impregnated canvas or other cloth or fibrous material carrying or containing suitable proportions of bakelite or other phenolic condensation cementing material is shown as united to a securing facing fabric such as 5, which may be sufficiently embedded in the cementing material of the body fabrics to be secured thereto while its outer surface is still in such penetrable or absorbent condition that it may be united by gum, glue, or rubber or other cements or adhesives to any coöperating article or material. A rubber layer or facing, such as 8, may be united to or incorporated with the fabric article as through the use of a connector fabric 6 of cotton or other suitable cloth or material which may, if desired, be provided with a frictioned or other rubber coating 7 on the side adjacent the rubber facing 8 so as to be more securely united therewith, the other side of this connector fabric 6 being sufficiently embedded in or secured to the body fabric by the action of the phenolic condensation cementing material which is incorporated therewith. All of these fabric and other elements may be effectively united and the rubber simultaneously vulcanized, if desired, by a single heat curing treatment under considerable pressure, and strips or slabs of such composite fabric may be formed or united in steam heated presses or other heating and pressing means. In this way the securing facing fabric may be used to unite this composite fabric article to a wood or other support or member by the use of originally incorporated or subsequently applied adhesive or cementing compositions so that the rubber facing 8 of any suitable character or composition of vulcanized rubber is securely supported so as to be used as a water-proof or other facing for the article or element and at the same time may be reinforced by the relatively strong and stiffer body fabric connected thereto which is impregnated with such more or less cured phenolic condensation cementing material. Such composite fabric may of course be bent or shaped as desired, preferably after being heated to facilitate bending and this considerably extends its use which is greatly promoted by the incorporation of such a cementable securing facing fabric therewith. Fig. 3 shows somewhat diagrammatically still another form of composite fabric or article in which one or more continuous rubber layers or other localized rubber portions or elements may be incorporated as desired. Any desired number of body fabric layers 1, 2 may be used in this connection and united, for instance, to a continuous layer 10 of vulcanized rubber by a connector layer 9 of fabric preferably of open texture or loosely twisted threads so as to promote penetration and effective union of this fibrous material by the rubber and the cementing compositions. It is not necessary in all cases to preliminarily coat such connector fabric with rubber since under considerable pressure the heated vulcanized rubber composition is forced into the fibers or interstices of the fabric sufficiently to be securely united therewith by the vulcanizing operation and this connector fabric may be simultaneously sufficiently embedded in or united to the adjacent body fabric by the phenolic condensation cementing material with which these body fabric layers are coated or impregnated. If desired, a securing facing fabric such as 4 of similar absorbent or loose textured cloth may be simultaneously united to the body fabric on the other side of this cushioning rubber layer. In some cases also it is desirable to form the composite fabric article with additional layers of body or reinforcing fabric, such as 12, 13, on the other side of the cushioning layer and united thereto by similar connector fabric layer 11. These body fabric layers 12, 13 may be, if desired, strong paper, cotton batting or other fibrous material, although cloth or other woven or knit fabric may be used if desired, sufficient incorporated phenolic condensation cementing material being preferably used in this body fabric to secure the same together and to secure thereto the connector fabric 11 and the securing facing fabric 14 which may be used, if desired.

Fig. 4 shows diagrammatically an illustrative way in which such composite fabric may be applied to an article such as the wood or other base or support 15. The composite fabric may in this instance comprise several layers of body fabric 21, 22, impregnated with phenolic condensation cementing material as generally described, and united to the securing facing fabric 5. By only slightly or partially curing such phenolic condensation cementing material the composite fabric may be rendered flexible and its application to a support or article of this kind promoted by heating it as on a steam heated or other plate to a temperature approximating 300° Fahrenheit more or less which renders the phenolic condensation cementing material sufficiently plastic so that the composite fabric may be readily bent or formed around the support and shaped thereto by any suitable shaping tools, such as shaping rolls or the like. It is desirable in this connection to simultaneously shape and secure a composite fabric facing or finishing to the article and for this purpose the article or support may be coated with a suitable adhesive, such as glue or other adhesive or cementing composition, and in some cases a thick shellac or other varnish or resinous composition 17 may be used which is rendered tacky and adhesive on heating and then on applying the heated composite fabric and forcing it against the support in connection with the shaping and molding of this fabric the securing facing fabric is adhesively secured to the support by the adhesive or cementing composition used and permanently united and secured in this position so as to form a desirable facing for tables, furniture or other articles for various purposes. In some cases it is desirable to apply to the composite fabric after it has been secured for such a support or article 2, a protective finishing varnish or other coating, such, for instance, as a bakelite or amberoid varnish coating 16 which may be applied to the exposed surface of the composite fabric and render it more impervious and improve its appearance in some cases.

This invention has been disclosed in connection with a number of illustrative embodiments, forms, proportions, elements, parts, shapes, materials, compositions, conditions, and methods of preparation, production and use, to the details of which disclosure the invention is not of course to be limited, since what is claimed as new and what is desired to be secured by Letters Patent is set forth in the appended claims:

1. The sheet of composite fabric comprising a number of layers of canvas body fabric thoroughly impregnated with and containing considerable proportions of phenolic condensation cementing material securely uniting said layers of fabric and in partially cured condition so that it is rendered plastic on heating to make the composite fabric pliable, an absorbent securing facing fabric on one side of said body fabric and embedded in such phenolic condensation cementing material and thereby united to said body fabric, and a layer of securing facing fabric on the other side of said body fabric and permanently united thereto by such phenolic condensation cementing material and carrying on its exposed surface adherent vulcanizable rubber cementing composition.

2. The sheet of composite fabric comprising a number of layers of body fabric thoroughly impregnated with and containing considerable proportions of phenolic condensation cementing material securely uniting said layers of fabric and in partially cured condition so that it is rendered plastic on heating to make the composite fabric pliable, and a layer of securing facing fabric on the other side of said body fabric and permanently united thereto by such phenolic condensation cementing material and carrying on its exposed surface adherent vulcanizable rubber cementing composition.

3. The sheet of composite fabric comprising a number of layers of body fabric containing considerable proportions of phenolic condensation cementing material securely uniting said layers of fabric and in partially cured condition so that it is rendered plastic on heating to make the composite fabric pliable, and a layer of securing facing fabric on the other side of said body fabric and permanently united thereto by such phenolic condensation cementing material and carrying on its exposed surface rubber cementing composition.

4. The sheet of composite fabric comprising a number of layers of woven body fabric carrying considerable proportions of phenolic condensation cementing material securely and compactly uniting said layers of fabric and in partially cured condition so that it may be rendered plastic on heating to make the composite fabric pliable, an absorbent securing facing fabric on one side of said body fabric and partially penetrated by such phenolic condensation cementing material and thereby united to said body fabric, and a layer of securing facing fabric on the other side of said body fabric and permanently united thereto by such phenolic condensation cementing material and carrying on its exposed surface incorporated adherent cementing composition.

5. The sheet of composite fabric comprising a number of layers of fabric carrying considerable proportions of phenolic condensation cementing material and securely and compactly uniting said layers of fabric, an absorbent securing facing fabric on one side of said body fabric and partially penetrated by such phenolic condensation cementing material and thereby united to said body fabric and carrying on its exposed surface incorporated adherent cementing composition.

6. The composite fabric article comprising a number of layers of fabric carrying considerable proportions of phenolic condensation cementing material securely and compactly uniting said layers of fabric, an absorbent securing facing fabric on one side of said body fabric and partially penetrated by such phenolic condensation cementing material and thereby united to said body fabric, and carrying on its exposed surface adherent cementing composition.

7. The sheet of composite fabric comprising a number of layers of woven body fabric thoroughly impregnated with and carrying phenolic condensation cementing material securely and closely uniting said layers of fabric and in partially cured condition so that it may be rendered plastic on heating to make the composite fabric pliable, and an absorbent knit securing fabric on one side of said body fabric and engaged by such phenolic condensation cementing material and thereby united to said body fabric while the exposed surface of said securing fabric is absorbent and penetrable to facilitate the engagement of cementing material therewith.

8. The composite fabric article comprising a number of layers of woven body fabric carrying phenolic condensation cementing material uniting said layers of fabric and an absorbent knit securing fabric on one side of said body fabric and engaged by such phenolic condensation cementing material and thereby united to said body fabric while the exposed surface of said securing fabric is absorbent and penetrable to facilitate the engagement of cementing material therewith.

9. The composite fabric article comprising body fabric carrying phenolic condensation cementing material uniting said layers of fabric, and an absorbent knit securing fabric on one side of said body fabric and engaged by such phenolic condensation cementing material and thereby united to said body fabric while the exposed surface of said securing fabric is absorbent.

10. The composite fabric article comprising a number of layers of body fabric carrying phenolic condensation cementing material securely uniting said layers of fabric, and an absorbent securing fabric on one side of said body fabric and united thereto by such phenolic condensation cementing material fabric, the exposed outer surface of said securing fabric being absorbent and capable of being securely engaged by cementing composition.

11. The composite fabric article comprising body fabric carrying phenolic condensation cementing material, and an absorbent securing fabric on one side of said body fabric and united thereto by such phenolic condensation cementing material fabric, outer portions of said securing fabric being absorbent and capable of being securely engaged by cementing composition.

12. The composite fabric comprising body fabric carrying phenolic condensation cementing material, and an absorbent securing fabric on one side of said body fabric and united thereto by such phenolic condensation cementing material fabric, outer portions of said securing fabric being capable of being securely engaged by cementing composition.

HENRY C. EGERTON.